Figure 1:
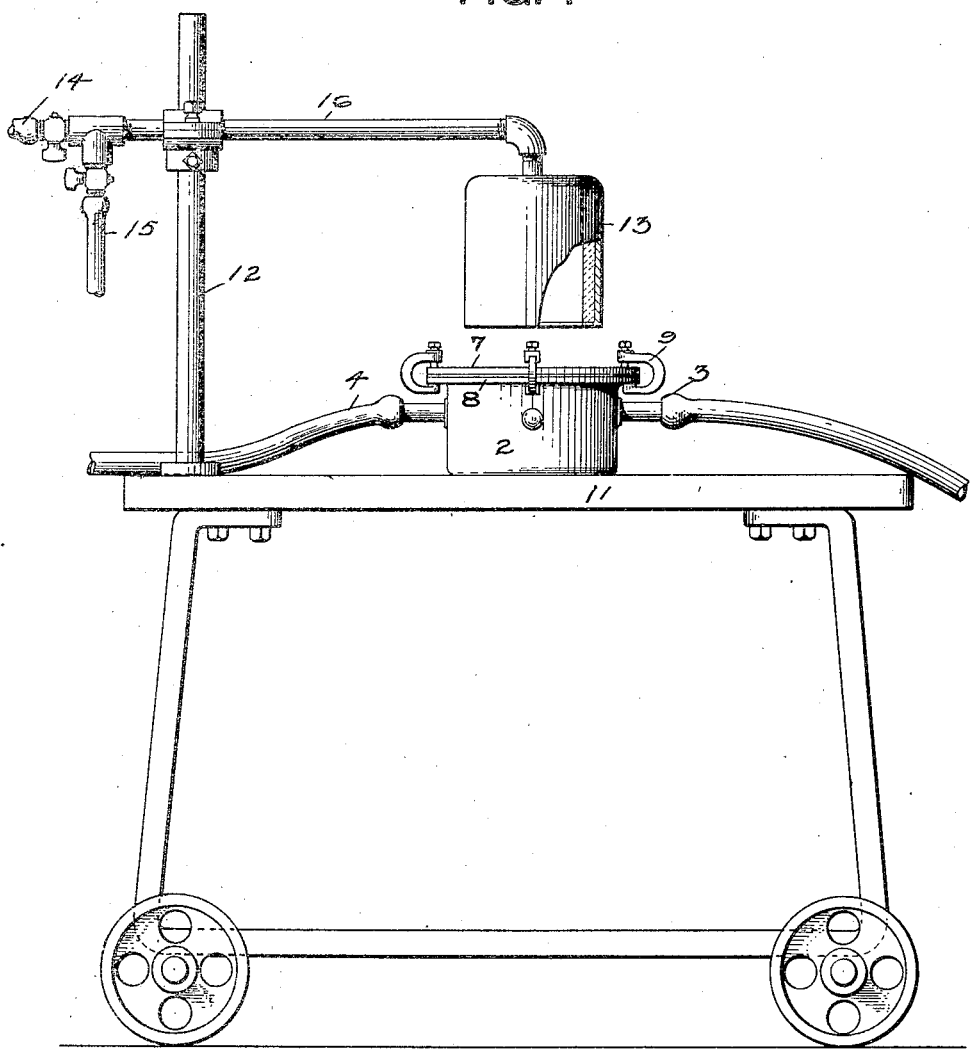

No. 877,923. PATENTED FEB. 4, 1908.
R. HALEY.
APPARATUS FOR FIRE FINISHING GLASSWARE.
APPLICATION FILED APR. 2, 1907.

2 SHEETS—SHEET 1.

WITNESSES.
INVENTOR.

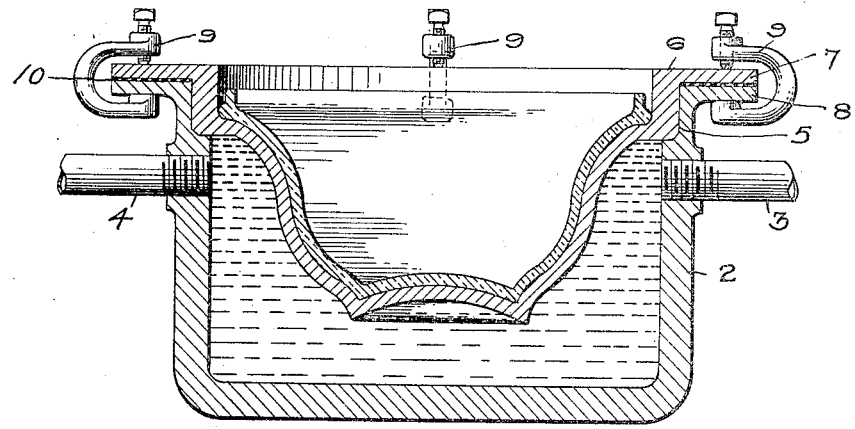
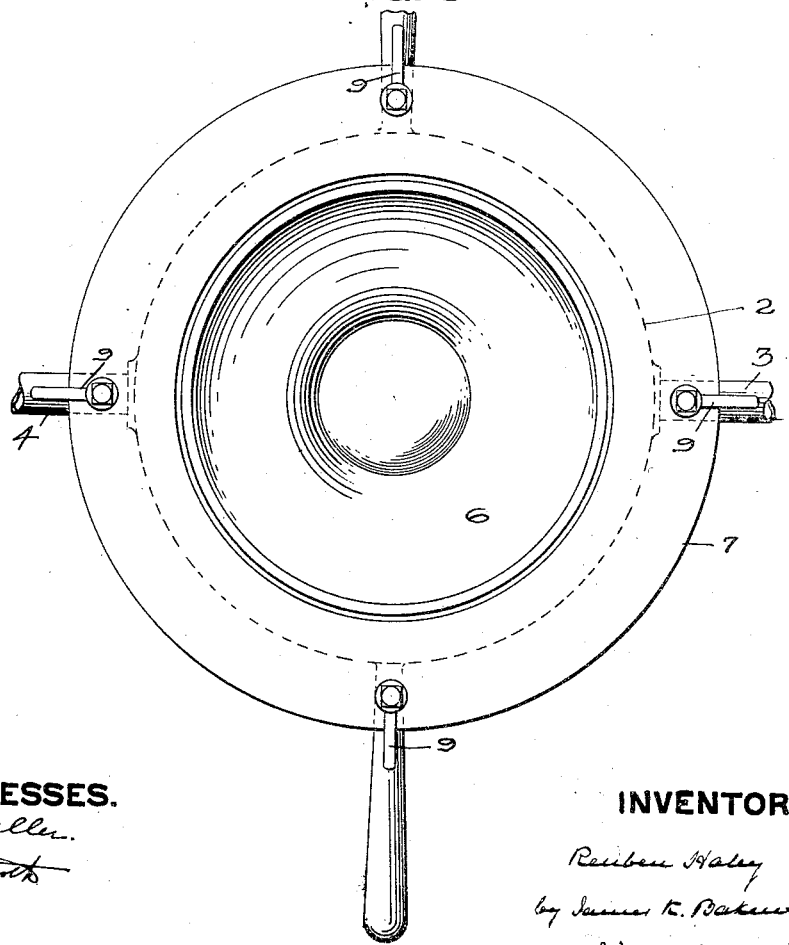

UNITED STATES PATENT OFFICE.

REUBEN HALEY, OF CRAFTON, PENNSYLVANIA, ASSIGNOR TO NATIONAL GLASS COMPANY, OF PITTSBURG, PENNSYLVANIA.

APPARATUS FOR FIRE-FINISHING GLASSWARE.

No. 877,923.

Specification of Letters Patent.

Patented Feb. 4, 1908.

Application filed April 2, 1907. Serial No. 365,911.

*To all whom it may concern:*

Be it known that I, REUBEN HALEY, of Crafton, in the county of Allegheny and State of Pennsylvania, have invented a new and useful Improvement in Apparatus for Fire-Finishing Glassware, of which the following is a full, clear, and exact description, reference being had to the accompanying drawing, forming part of this specification, in which—

Figure 1 is an elevation partly in section illustrating apparatus involving my invention; Fig. 2 is a vertical sectional view of a portion of the same; and Fig. 3 is a plan view of the portion shown in Fig. 2.

Like symbols of reference indicate like parts wherever they occur.

In the manufacture of glass-ware it is customary to fire-finish either a portion or the whole of the surface of the glass article by subjecting it to a glazing or polishing heat which is of sufficient intensity to melt the surface of the glass, thus removing mold marks and sharp edges imparting the required luster and brightness. In the finishing of figured glass-ware, however, where the polishing action of the heat is applied to the figured surfaces, the melting of the surface of the glass during the fire-polishing operation necessarily destroys the sharpness of the angles of the figured surface. Another difficulty experienced in fire-finishing glass-ware is that owing to the intense heat to which the glass is subjected, the body of the glass is often softened and the shape of the article is often more or less distorted.

It has heretofore been customary, in the cases of articles only a portion of the surface of which needs fire-finishing, to apply the heat only to such portions and to protect the remaining portion, either by allowing it to remain in the mold, by placing it in a suitable former, or by permitting or causing a current of cold air to come in contact with that surface of the glass which it is desirable that they should be applied. The chief objections to these prior methods are that it is difficult to apply the heat and cooling mediums evenly and regularly to those portions of the glass to which it is desirable that they should be applied.

The object of my invention is to provide means by which a heating medium may be caused to act evenly on one portion or surface of the glass article, and cooling means may be caused to act evenly on the figured or other portion of the glass which it is desirable should be protected from the action of the heat.

I will now describe my invention so that others skilled in the art may be enabled to employ the same.

In the drawing, 2 represents a vessel adapted to contain a cooling medium, 3 indicates an inlet pipe, and 4 the outlet pipe. In the upper part of the vessel 2 is a seat 5 adapted to receive and support the imperforate former 6. The former 6 and the vessel 2 are provided with projecting annular flanges 7 and 8 adapted to be clamped together by the clamps 9, the packing 10 forming a tight joint. The inner surface of the former 6 is given the shape, configuration, or pattern of the vessel to be fire-finished. The vessel 2 is adapted to be supported on a stand 11. Extending from this stand 11 is a standard 12 on which is adjustably supported a pivoted gas furnace 13 having an air pipe 14 and a gas pipe 15 connecting with the supply pipe 16 of the furnace. It will be evident to those skilled in the art that as many furnaces and cooling vessels and formers as desired may be placed upon a single stand.

The operation of my apparatus is as follows: The former 6, having been clamped to the vessel 2 and the cooling medium, such as water, ammonia vapors, or other suitable medium is caused to pass through the interior of the vessel 2 against the outer face of the imperforate former 6. The glass article to be fire-finished is placed in the interior of the former 6 and thereby the outer surface of the glass article is kept cool by the action of the cooling medium against the outer surface of the imperforate former. At the same time, the furnace 13 is swung over the mouth of the former 6 and the interior of the glass vessel in the former is fire-finished by the heat from the furnace. After the glass has been sufficiently fire-finished, the furnace 13 is swung to one side and the glass article is removed, either by inverting the former 6 and vessel 2, or by other suitable means.

I am aware that it is not new to cause air in a chamber or vessel to directly strike against the outer surface of the glass article through perforations in the former. I am also aware that it is not new to fire-finish the interior of glass articles while the outer surface of the glass is supported by a former or mold and I do not desire to claim the same broadly.

What I claim and desire to secure by Letters Patent is:

1. In apparatus for fire-finishing glassware, the combination of a device for producing heat adapted to project heat against one surface of a glass article, a vessel or chamber adapted to contain a cooling medium, and an imperforate former adapted to be supported in the chamber containing the cooling medium and to come in contact with the other surface of the glass article; substantially as specified.

2. In apparatus for fire-finishing glassware, the combination of a gas burner adapted to project heat against one surface of a glass article, a vessel adapted to contain a cooling medium, and an imperforate former adapted to support the glass article and to sit within the vessel containing the cooling medium; substantially as specified.

In testimony whereof I have hereunto set my hand

REUBEN HALEY.

Witnesses:
    JAMES K. BAKEWELL,
    CARRIE E. EGGERS.